United States Patent [19]

Hsu

[11] Patent Number: 5,365,902
[45] Date of Patent: Nov. 22, 1994

[54] METHOD AND APPARATUS FOR INTRODUCING FUEL INTO A DUEL FUEL SYSTEM USING THE H-COMBUSTION PROCESS

[75] Inventor: Bertrand D. Hsu, Erie, Pa.

[73] Assignee: General Electric Company, Schenectady, N.Y.

[21] Appl. No.: 120,620

[22] Filed: Sep. 10, 1993

[51] Int. Cl.[5] .................... F02D 19/08; F02M 59/26
[52] U.S. Cl. .................................. 123/299; 123/304
[58] Field of Search ............... 123/27 GE, 299, 304

[56] References Cited

U.S. PATENT DOCUMENTS

| | | | |
|---|---|---|---|
| 4,399,786 | 8/1983 | Holmer | 123/299 |
| 4,503,832 | 3/1985 | Pefley et al. | 123/27 GE |
| 4,542,725 | 9/1985 | Yasuhara | 123/299 |
| 4,546,739 | 10/1985 | Nakajima et al. | 123/299 |
| 4,619,240 | 10/1986 | Bedford et al. | 123/27 GE |
| 4,700,672 | 10/1987 | Baguena | 123/304 |
| 4,748,949 | 6/1988 | Steiger et al. | 123/299 |
| 4,836,161 | 6/1989 | Abthoff et al. | 123/299 |
| 5,117,801 | 6/1992 | Schaub et al. | 123/276 |
| 5,168,846 | 12/1992 | Paul et al. | 123/299 |
| 5,199,398 | 4/1993 | Nylund | 123/299 |
| 5,293,851 | 3/1994 | Schaub | 123/275 |
| 5,297,520 | 3/1994 | Danyluk | 123/299 |

OTHER PUBLICATIONS

"Large Diesel Engines Using High Pressure Gas Injection Technology," O. Grone, P. S. Pedersen, Gastech 86 LNG/LPG Conference, Proceedings; Hamburg, West Germany; Nov. 25–28, 1986, pp. 303–315.

"Development of the Sulzer Dual Fuel Diesel Engine," B. Engesser, H. B. Zehnder, T. Imai, H. Tanaka, Y. Koyama, Y. Suzuki, K. Takahashi; Gastech 86 LNG/LPG Conference, Proceedings 15; Hamburg, West Germany; Nov. 25–28, 1986, pp. 261–283.

"High-Pressure, Digitally Controlled Injection of Gaseous Fuel in a Diesel Engine, with Special Reference to Boil-Off from LNG Tankers," P. M. Einang, S. Koren, R. Kamsdal, T. Hansen, A. Sarsten; 15th International Congress on Combustion Engines; Paris, France; Jun. 13–16, 1983, pp. 1285–1310.

"Medium Speed 4-Stroke Diesel Engine Using High Pressure Gas Injection Technology," P. M. Einang, H. Engia, R. Vestergren; Proc., 18, International Congress on Combustion Engines, 1989, pp. 916–932.

Primary Examiner—David A. Okonsky
Attorney, Agent, or Firm—Jill M. Breedlove; Marvin Snyder

[57] ABSTRACT

A method and apparatus are provided for introducing a main fuel and a pilot fuel which is more readily flammable than the main fuel and which serves to ignite the main fuel into an internal combustion engine having at least one cylinder having a combustion chamber. A set of conditions are defined to constitute high load conditions on the engine and to constitute low load conditions on the engine. The load conditions are detected. At high load conditions, the main fuel is introduced into the combustion chamber prior to introducing the pilot fuel and the pilot fuel is introduced into the combustion chamber a predetermined amount of time after the introduction of the main fuel. At low load conditions the pilot fuel is introduced into the combustion chamber in advance of the main fuel, and the main fuel is introduced into the combustion chamber a predetermined amount of time after the introduction of the pilot fuel.

10 Claims, 3 Drawing Sheets

GAS IN ADVANCE OF PILOT
HIGH LOAD OPERATION INJECTION TIMINGS AND COMBUSTION HEAT RELEASE

PILOT IN ADVANCE OF GAS
LOW LOAD OPERATION INJECTION TIMINGS AND COMBUSTION HEAT RELEASE

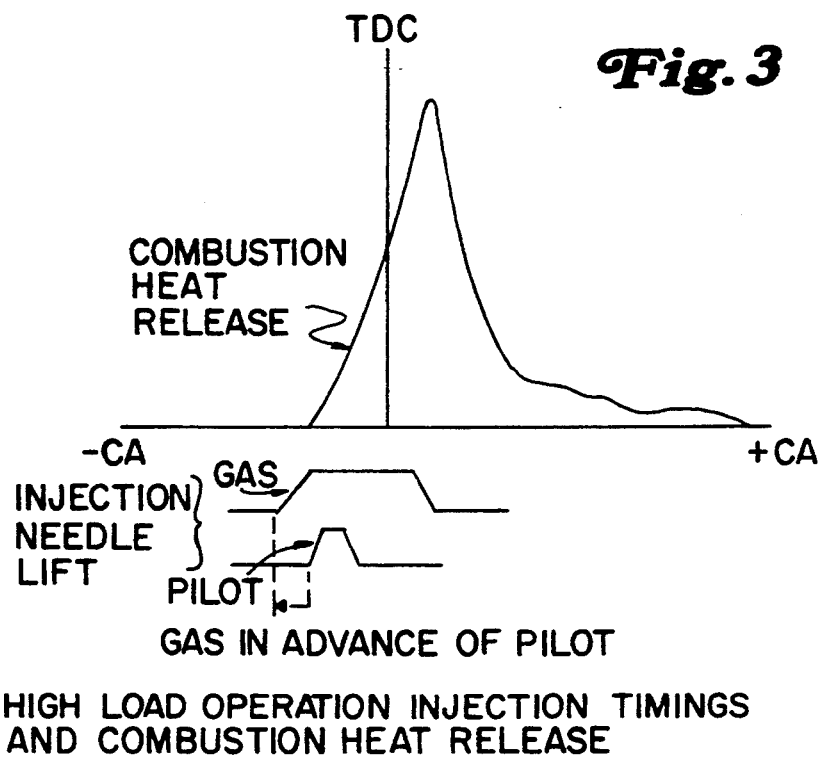
HIGH LOAD OPERATION INJECTION TIMINGS AND COMBUSTION HEAT RELEASE
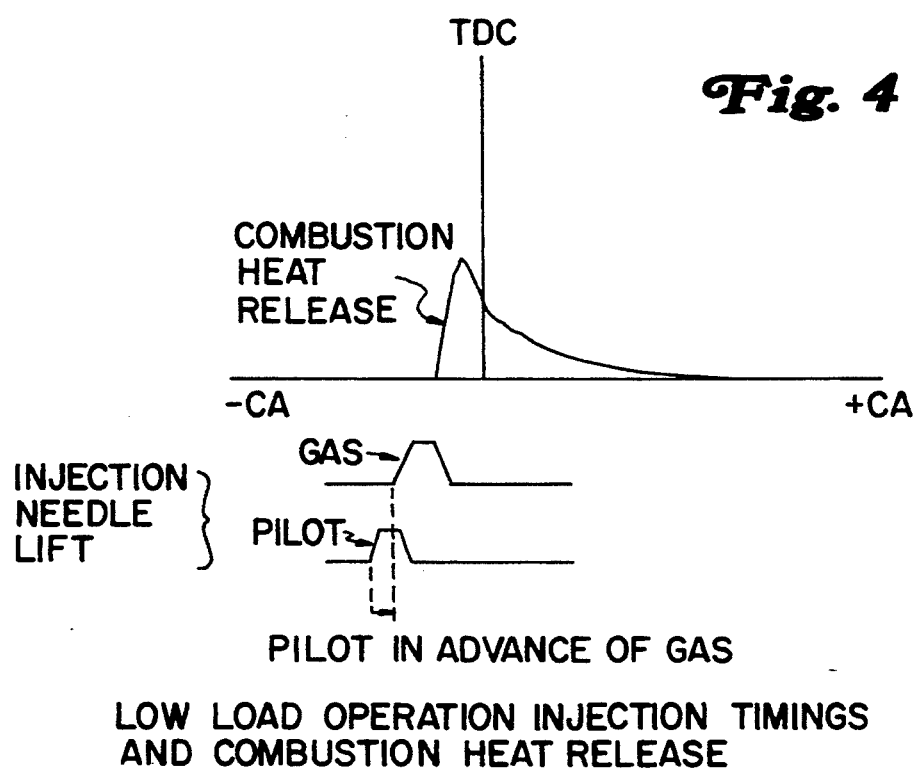
LOW LOAD OPERATION INJECTION TIMINGS AND COMBUSTION HEAT RELEASE

METHOD AND APPARATUS FOR INTRODUCING FUEL INTO A DUEL FUEL SYSTEM USING THE H-COMBUSTION PROCESS

TECHNICAL FIELD

This invention relates apparatus and a method of combining diffusion combustion and premixed combustion in a dual fuel system by controlling the timing of the pilot fuel and main fuel injections. The apparatus and method of this invention may be used to advantage in duel fuel diesel engines, and especially locomotive engines.

BACKGROUND OF THE INVENTION

Diesel engines efficiently convert the latent heat of hydrocarbon fuel into useful mechanical power. In the operation of conventional diesel engines, a metered amount of fuel is injected into each cylinder of the engine at recurrent intervals synchronized with rotation of the engine crankshaft to coincide with the air-compression stroke of a reciprocating piston. As the pressure in the combustion chamber increases, the compression temperature in the cylinder rises and the injected fuel is soon hot enough to ignite. The resulting combustion or firing of fuel in the cylinder forces the piston to move in the opposite direction, thereby applying torque to the engine camkshaft.

Conventional diesel engine fuel is a relatively low grade, refined petroleum known generally as diesel fuel oil which has desirable ignition and heat release characteristics. Diesel fuel oil has acceptably low levels of corrosive, abrasive and other noxious matter, and it is in ample supply at the present time.

Diesel engines typically burn fuel in a diffusion combustion mode. In that mode, the fuel burns as it comes into the chamber before it is well mixed with air. Since only pure air is compressed in the compression stroke of the engine, a high compression ratio can be used to obtain high cycle efficiency. However, the local combustion air to fuel ratio cannot be controlled.

On the other hand, gasoline engines, such as automobile engines, burn fuel after it has been well mixed with air. This mode of burning fuel is called premixed combustion. In this mode, the fuel is pre-mixed with air to form a combustible mixture. The mixture is compressed in the compression stroke of the engine. The compression ratio is limited to a lower value to avoid the hazardous "detonation" or "knock". Lower cycle efficiency results. However, the combustion air to fuel ratio can be controlled. In this case, the advantage of "lean burn" can be obtained. The conventional gas engine operates in this combustion mode. Usually, the gas fuel is introduced at low pressure either into the intake manifold or directly into the engine cylinder before the compression stroke. This is also known as low pressure gas engine. There are other advantages and disadvantages to pre-mixed combustion, which are well known to those skilled in the art. There are also other advantages and disadvantages of diffusion combustion, which are also well known to those skilled in the art.

Recently, some dual fuel gas engines, called high pressure injection gas engines, have become known in the art. They also utilize a diffusion combustion mode, with ignition source which is used to ignite the fuel.

More than 65 years ago it was recognized that a small amount of readily ignitable pilot fuel could be injected in diesel engines to improve combustion of "heavy" hydrocarbon fuels that are otherwise difficult to ignite. See British Patent No. 124,642. As used herein, the term "pilot fuel" means relatively light hydrocarbon fuel (e.g. methanol or even standard diesel fuel oil) characterized by being significantly easier to ignite than the primary fuel in the injection system.

SUMMARY OF THE INVENTION

It is an object of the present invention to combine the advantages of diffusion combustion and premixed combustion in a diesel engine.

It is also an object of the present invention to retain the full high efficiency and high output advantages of the high pressure gas injection engine, and at the same time, maximally utilize the "lean burn" pre-mixed combustion concept to reduce NOx and particulate emissions. This is accomplished through varying the relationship of the pilot and gas fuel injection timings.

In accordance with the present invention, a method of operating a dual fuel internal combustion engine having at least one cylinder having a combustion chamber is provided in which one of the fuels is a pilot fuel which burns more readily than the other fuel, which is the main fuel. In one embodiment of this invention, for example, the pilot fuel is conventional diesel fuel, and the main fuel is natural gas. Both fuels are fed into the engine cylinder through high pressure injection nozzles. The pilot fuel serves to ignite the main fuel. The timing of the injection of the pilot fuel and main fuel depends on whether the engine is operated at low load conditions or at high load conditions. Thus a set of conditions is defined to constitute high load conditions on the engine, and defining another set of conditions is defined to constitute low load conditions on the engine.

The load conditions on the engine are detected. At high load conditions, the main fuel is introduced into the combustion chamber prior to introducing the pilot fuel. The pilot fuel is introduced into the combustion chamber a predetermined amount of time after the start of and during the main fuel introduction. The amount of main fuel that is injected into the engine cylinder before pilot fuel introduction cannot be self-ignited and will mix with air. It forms the pre-mixed portion of combustible fuel that will burn later. The fuel that is injected after pilot fuel injection will be ignited by the pilot fuel and burns as soon as it enters the engine cylinder. It does not have time to fully mix with air, therefore will burn in the diffusion combustion mode. It also serves as a strong ignition source for the earlier pre-mixed part of the fuel. Alternately, the pre-mixed part of the fuel can be low pressure gas supplied through the intake manifold of the engine, provided the air to fuel ratio ("A/F") does not cause engine "knock" during compression stroke. Yet another alternative could be any easily evaporated fuel, such as gasoline, to be supplied in the intake manifold and pre-mixed with air. At low load conditions, the pilot fuel is injected into the combustion chamber in advance of the main fuel, and the main fuel is introduced into the combustion chamber a predetermined amount of time after the introduction of the pilot fuel. All fuels burn in the diffusion mode.

In order to fully utilize both the high efficiency associated with the high pressure injection gas engine cycle and the low emission characteristics of the low pressure "lean burn" gas engine cycle, the injection timing of the pilot fuel should be in retard of the gas injection timing at the higher load operation conditions where the overall A/F of combustion gas is above the lower flammability limit. At the lower load conditions where the combustion gas overall A/F falls out of the flammability limit, the pilot fuel injection timing has to be in advance of the gas fuel injection timing. A hybrid of the two combustion modes can make the engine benefit from both.

This invention also includes injection apparatus for separately injecting primary fuel and a high combustion auxiliary fuel into combustion chambers of an internal combustion engine having at least one cylinder having a combustion chamber and a diesel locomotive engine including such apparatus. The injection apparatus includes meters for defining a set of conditions to constitute high load conditions on the engine, and defining another set of conditions to constitute low load conditions on the engine. It also includes load sensing means for detecting the load conditions of the engine. Control means are provided for determining the relationship of the timing of the injection of the auxiliary fuel into the combustion chamber with respect to the primary fuel in cooperation with the load sensing means to achieve a predetermined specific fuel consumption, a predetermined combustion efficiency, and a predetermined peak cylinder firing pressure. Means are provided for introducing the main fuel into the combustion chamber at high load conditions prior to introducing the pilot fuel and for introducing the pilot fuel into the combustion chamber a predetermined amount of time after the introduction of the main fuel. Means are provided for introducing the pilot fuel into the combustion chamber at low load conditions in advance of the main fuel and for introducing the main fuel into the combustion chamber a predetermined amount of time after the introduction of the pilot fuel.

Since this invention uses a hybrid of diffusion and pre-mixed modes of combustion, about half of the total fuel is burned in each of the two modes of combustion, therefore it will be named the "H-Combustion Process."

THE DRAWINGS

FIG. 3 is a graph showing the timing of the introduction of the pilot fuel and gas fuel at high load conditions.

FIG. 4 is a graph showing the timing of the introduction of the pilot fuel and gas fuel at low load conditions.

DETAILED DESCRIPTION

Figure 1:
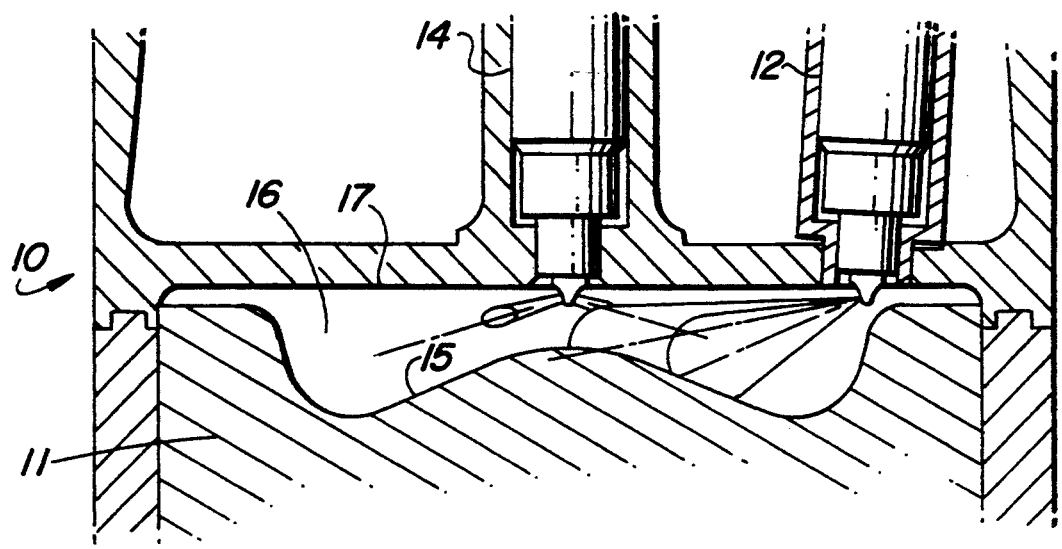
FIG. 1 is a sketch showing one embodiment of a dual fuel combustion chamber which may be used in the present invention.

FIG. 1 depicts the components of a typical combustion chamber of a cylinder in a diesel engine that are relevant to this invention. Cylinder 10 of the diesel engine houses a reciprocating piston 11 which is operatively connected to a crankshaft (not shown) as is known to those skilled in the art. The combustion chamber 16 of the cylinder 10 consists of the area in the cylinder between the top 15 of the piston 11 and below the cylinder head 17.

Cylinder 10 is provided with means for introducing two fuels into the combustion chamber 16. Means for introducing the main fuel comprises main fuel injector 12. In the two fuel injection system shown, the main fuel is compressed natural gas and the other fuel is a readily combustible fuel, such as pilot diesel fuel. In the embodiment illustrated, a separate fuel injector 14 is used to inject the pilot fuel. Alternatively, one injector having two fuel systems may be used. In either case, such fuel injectors are known to those skilled in the art.

As is known to those in the art, conventional diesel engines typically have a crankshaft mechanically coupled to a variable load such as the rotor of an alternating current generator that supplies electric power to an electric load circuit. The power output of the generator and hence the load imposed on the engine crankshaft is limited by a regulator. The engine typically has multiple sets of two cylinders in which reciprocating pistons are respectively disposed, the pistons being respectively connected via rods and journals to individual eccentrics or cranks of the crankshaft. In a typical medium speed 4,000-horsepower engine, there are 16 cylinders, the cylinder bore is approximately nine inches, and the compression ratio is of the order of 12. Each cylinder has air inlet and exhaust valves (not shown) that are controlled by associated cams on the engine camshaft which is mechanically driven by the crankshaft In a 4-stroke engine, the camshaft turns once per two full revolutions of the crankshaft, and therefore 2:1 speed reducing gearing is provided.

In one embodiment of this invention, a multi-cylinder diesel engine has cylinders having a 229 mm bore, a 267 mm stroke and a rated speed of 1050 rpm. The combustion chamber 16 has a central mounted pilot diesel fuel injector 14 and a side placed main fuel injector 12. The pilot fuel injection system and the main fuel injection systems are conventional systems known to those skilled in diesel engine systems and are controlled by conventional electronic control systems, also known to those skilled in diesel engine systems. The injection timings and quantities can be varied by those systems in accordance with the invention described below.

High pressure (e.g., 3500–4000 psi) compressed natural gas is injected through the gas fuel (or main fuel) injector 12 providing the bulk of the fuel needed for full load operation. A small amount of diesel fuel, such as about 4% to about 7% by energy is injected through the pilot injector 14 to provide an ignition source for the gas fuel. Other readily combustible pilot fuels may also be used. This is known as the basic "High Pressure Gas Injection" design.

Normally, the high pressure gas injection design burns the gas fuel in the diffusion combustion mode. The pilot fuel combustion causes the gas fuel to burn as soon as it enters the combustion chamber 16. In this fashion, the gas does not have time to be pre-mixed evenly with air before ignition. No combustible mixture of gas is subjected to high in-cylinder compression temperature and pressure. The well known uncontrollable "combustion knock" of reciprocating internal combustion gas engine will not occur. A high compression ratio can thus be used to obtain high efficiency and high engine power output. No special inlet air cooling to prevent "knock" is necessary. Since this design burns gas fuel in the same diffusion mode as liquid diesel fuel in a normal diesel engine, the emissions level is not much different from a standard diesel engine. For normal diesel engines, the emissions of concern are the high NOx level (8–10 gm/bhp-hr) and the black smoke (or particulate). Comparing the gaseous and liquid diesel fuel combustion processes, the NOx generation associated with local high temperature diffusion combustion is not altered. The soot formation process as a result of local fuel rich combustion is somewhat changed but not eliminated. The oxidation process of gaseous fuel is slightly faster due to the elimination of liquid fuel evaporation time. The amount of fuel subjected to pyrolysis before oxidation (basis of soot formation) becomes less. Thus, some improvements to smoke and particulate emission can be expected.

Modern day low emissions lean burn pre-mixed gas engines can operate with very low NOx (2 gm/bhp-hr) and particulate levels. This is done through timed injection of the low pressure gas into the air either just ahead of the intake valve or directly into the engine cylinder before the compression stroke. In order to achieve low emissions, the bulk of the gas fuel is burned at very lean mixture strength (low equivalence ratio) to keep the combustion temperature low. Since it is pre-mixed evenly with plenty of excess air, smoke or particulate resulting from incomplete combustion is also low. However, it does not have the same thermal efficiency and specific engine output as a liquid diesel fuel engine for reasons mentioned in the previous paragraph.

In a typical liquid diesel fuel engine operating at high engine output or high loads, the overall equivalence ratio (defined as the stoichiometric A/F divided by the actual A/F) is about 0.55 to 0.65. If the engine is turbo charged, this equivalence ratio is maintained down to about 30% load. A high pressure gas injection engine can operate in the same range. A low pressure pre-mixed combustion engine also operates in this equivalence ratio range.

Figure 2:
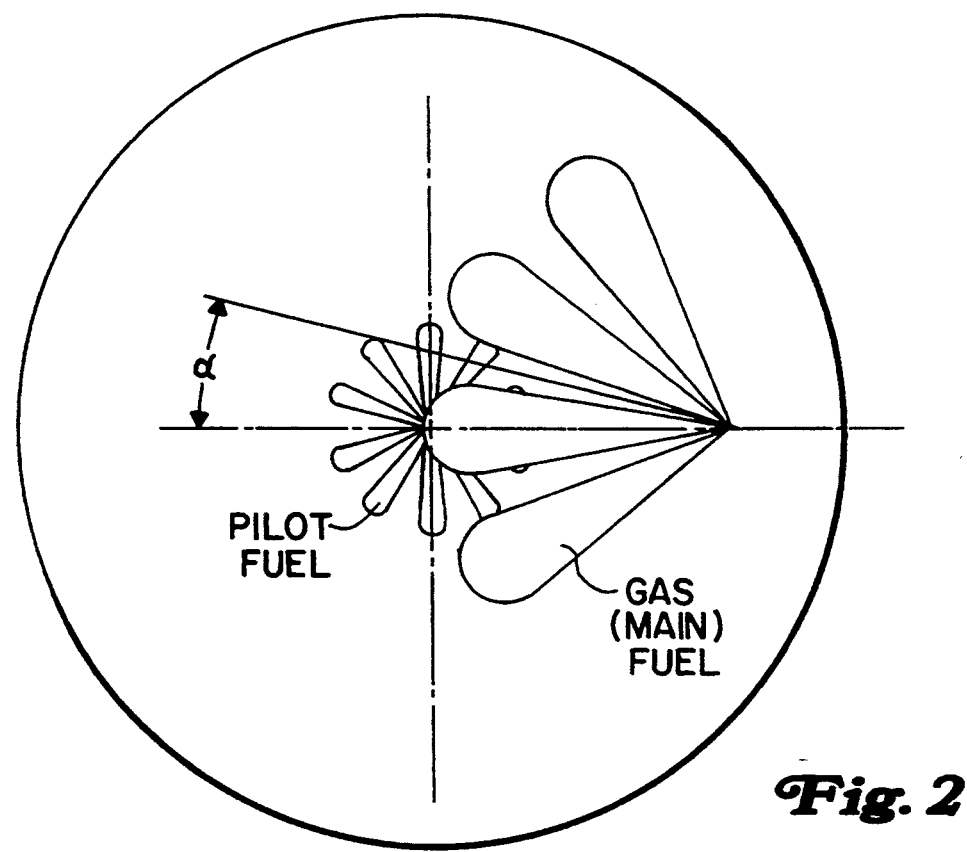
FIG. 2 is a sketch showing the angle at which the pilot fuel and main fuel are injected in the combustion chamber shown in FIG. 1.

The present invention calls for gas injection timing in advance of pilot fuel injection timing at high load conditions. The injection timings and the resultant engine combustion heat release are shown in FIG. 3. In one embodiment of this invention, as is shown in FIG. 1, the pilot injector 14 is located in the center of the engine cylinder 10 with symmetrically distributed fuel sprays. The high pressure gas injector 12 is located on the side of the cylinder, with sprays generally aim towards the center of the cylinder 10. However, the symmetry line of the spray is at an angle $\alpha$ to the cylinder diameter, as shown in FIG. 2. Angle $\alpha$ should be a sufficient number of degrees so that an angular momentum to the cylinder charge results when the gas injection starts, and so that a substantial amount of the main fuel is intermixed with cylinder charged air prior to combustion. In the example shown, angle $\alpha$ is about 14 degrees, but it may vary depending on the dimensions of the cylinder, the arrangement of the pilot fuel injectors and gas fuel injectors with respect to one another, and on other factors. The introduction of the main fuel at an angle is important to ensure the premixed fuel sufficiently utilizes cylinder charged air. The gas that is injected before ignition will be pre-mixed with air before ignition. Since the overall equivalence ratio is correct, some pre-mixed lean burning of gas will occur. Consequently, some reduction of NOx and particulate emissions will be obtained. The earlier the gas fuel is injected in advance of the pilot fuel, the more pre-mixed type of burning will occur. The limit of gas injection advance in relation to pilot fuel is the point at which "knocking" would begin. Thus, low emission type of "lean burn" is used to the fullest extent while maintaining the high efficiency and output of a high pressure gas injection type engine. As stated before, the layout of the cylinder need not be exactly as shown. A concentric dual fuel injector that can provide well mixing of pre-mixed fuel will also serve the purpose. Alternatively, the premixed portion of the fuel can be supplied through the intake manifold or into the engine cylinder before the compression stroke.

When the engine load is reduced below 30%, the overall equivalence ratio is found well below the flammability limit for most gaseous fuel. For instance, it is in the 0.2 to 0.3 range, which is much below the 0.46 lower flammability limit for methane gas. There is virtually no inlet air boost at those low loads. The amount of fuel needed to support the low load operations cannot bring the overall equivalence ratio of a naturally aspirated cylinder to be above the flammability limit. Therefore, no pre-mixed combustion can occur. Gaseous fuel has to be burned in the diffusion mode as soon as it enters the cylinder. Otherwise, it will not be burned at all. Very high level of hydrocarbon emissions can result. It is essential to inject the pilot fuel into the engine cylinder before the gas fuel as shown in FIG. 4. In this manner, pilot fuel burning can support a diffusion type of combustion as soon as gas fuel enters into the engine cylinder.

Figure 5:
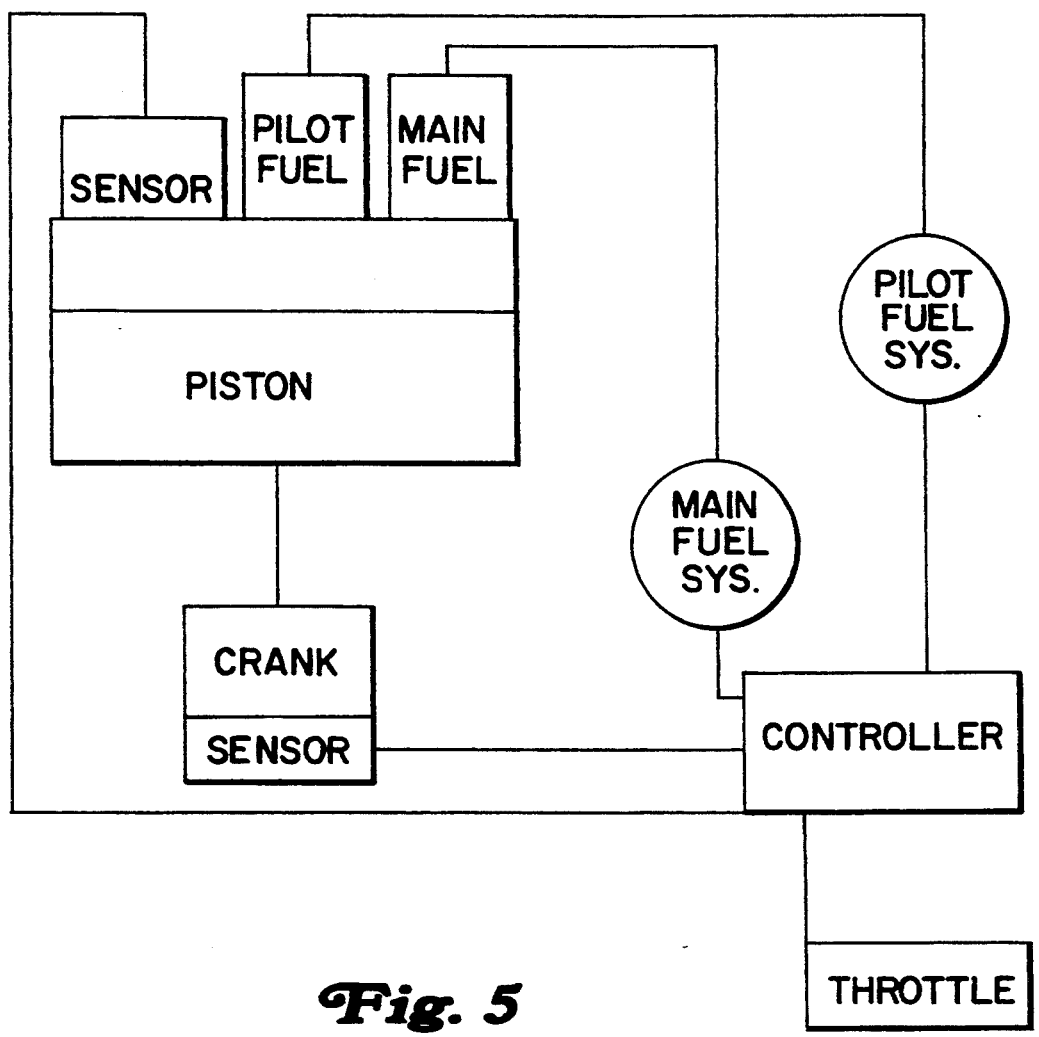
FIG. 5 is a block diagram illustrating apparatus used in the invention.

Apparatus for practicing this invention is shown in block diagram form in FIG. 5. Each of the fuel injectors 12 and 14 (as shown in FIG. 1) are operatively connected to fuel injection systems 51 and 53. The fuel injection system for the main fuel may be any system which is known to those skilled in the art. The fuel injection system for the pilot fuel 53 may be any system which is known to those skilled in the art. Sensor means 55, which may be pressure transducers, temperature sensors, and/or engine crank encoders are provided in communication with the combustion chambers, and/or the crank, and/or the linkage of the engine, and/or the throttle. Control means 57, which may be a computer or any microprocessor driven device, are in communication with such sensor or sensors. The control means are operatively in communication with the fuel injection systems, and control those systems in response to the throttle input.

This invention uses a hybrid of diffusion and pre-mixed modes of combustion. It is named the "It-Combustion Process."

I claim:

1. A method of introducing a main fuel and a pilot fuel which is more readily flammable than the main fuel into an internal combustion engine having at least one cylinder having a combustion chamber comprising:
   a. defining a set of conditions to constitute high load conditions on the engine, and defining another set of conditions to constitute low load conditions on the engine;
   b. detecting the load conditions on the engine; and,
   c. at high load conditions,
      (1) introducing the main fuel into the combustion chamber prior to introducing the pilot fuel;
      (2) introducing the pilot fuel into the combustion chamber a predetermined amount of time after the introduction of the main fuel; and,
   d. at low load conditions
      (1) introducing the pilot fuel into the combustion chamber in advance of the main fuel;
      (2) introducing the main fuel into the combustion chamber a predetermined amount of time after the introduction of the pilot fuel.

2. The method of claim 1 in which the main fuel is injected in a manner so that a substantial amount of it is intermixed with cylinder charged air prior to combustion.

3. The method of claim 1 in which the pilot fuel is diesel fuel.

4. The method of claim 1 in which the main fuel is natural gas.

5. The method of claim 1 in which a pre-mixed portion of the main fuel is gasoline.

6. The method of claim 5 in which the gasoline has been premixed with air prior to its introduction into the combustion chamber.

7. The method of claim 1 in which the main fuel is natural gas, and the pilot fuel is diesel fuel, and in which the natural gas is injected into the combustion chamber at high load conditions so that about 50% of the total amount of natural gas is introduced prior to the introduction of the diesel fuel.

8. The method of claim 1 in which the main fuel is natural gas, and the pilot fuel is diesel fuel, and in which the diesel fuel is injected into the combustion chamber at low load conditions prior to the introduction of the natural gas within an ignition delay time (normally 1~2 ms) of the pilot fuel.

9. Apparatus for separately injecting primary fuel and a high combustion auxiliary fuel into a combustion chamber of an internal combustion engine having at least one cylinder having said combustion chamber comprising:
   a. means for defining a set of conditions to constitute high load conditions on the engine, and defining another set of conditions to constitute low load conditions on the engine;
   b. load sensing means for detecting the load conditions of the engine;
   c. control means for determining the relationship of the timing of the injection of the auxiliary fuel into the combustion chamber with respect to the primary fuel in cooperation with the load sensing means to achieve a predetermined specific fuel consumption, a predetermined combustion efficiency, and a predetermined peak cylinder firing pressure; and
   d. means for introducing the main fuel into the combustion chamber at high load conditions prior to introducing the pilot fuel and for introducing the pilot fuel into the combustion chamber a predetermined amount of time after the introduction of the main fuel; and,
   e. means for introducing the pilot fuel into the combustion chamber at low load conditions in advance of the main fuel and for introducing the main fuel into the combustion chamber a predetermined amount of time after the introduction of the pilot fuel.

10. A diesel locomotive internal combustion engine comprising at least two cylinders, each having a reciprocating piston operatively connected to a crank and a combustion chamber, also comprising means for separately injecting a primary fuel and a high combustion auxiliary fuel into the combustion chambers of an internal combustion diesel engine comprising:
   a. means for defining a set of conditions to constitute high load conditions on the engine, and defining another set of conditions to constitute low load conditions on the engine;
   b. load sensing means for detecting the load conditions of the engine;
   c. control means for determining the relationship of the timing of the injection of the auxiliary fuel into the combustion chamber with respect to the primary fuel in cooperation with the load sensing means to achieve a predetermined specific fuel consumption, a predetermined combustion efficiency, and a predetermined peak cylinder firing pressure; and
   d. means for introducing the main fuel into the combustion chamber at high load conditions prior to introducing the pilot fuel and for introducing the pilot fuel into the combustion chamber a predetermined amount of time after the introduction of the main fuel; and,
   e. means for introducing the pilot fuel into the combustion chamber at low load conditions in advance of the main fuel and for introducing the main fuel into the combustion chamber a predetermined amount of time after the introduction of the pilot fuel.

* * * * *